United States Patent [19]
Glider

[11] 3,809,167
[45] May 7, 1974

[54] DEVICE FOR POSITIONING A PIVOTAL VEHICLE BOTTOM GUARD

[75] Inventor: Lawrence James Glider, Dubuque, Iowa

[73] Assignee: Deere & Company, Moline, Ill.

[22] Filed: Dec. 14, 1972

[21] Appl. No.: 315,148

[52] U.S. Cl............... 172/808, 172/801, 180/69.1, 280/154.5 R
[51] Int. Cl........................ E02f 3/76, B62d 25/20
[58] Field of Search .......... 172/276, 297, 438, 801, 172/808; 180/68 P, 69.1, 84; 280/154.5 R; 298/1 SG

[56] References Cited
UNITED STATES PATENTS

| 3,208,766 | 9/1965 | Domes | 180/69.1 X |
| 3,310,344 | 3/1967 | Beintum et al. | 298/1 SG |
| 3,543,867 | 12/1970 | Smemo et al. | 172/801 |
| 3,640,577 | 2/1972 | Ducote | 298/1 SG |
| 3,670,835 | 6/1972 | Ross et al. | 180/69.1 |

Primary Examiner—J. Reed Fisher
Assistant Examiner—Paul T. Sewell

[57] ABSTRACT

A skidder-type vehicle includes a blade assembly vertically pivotally mounted on the main frame of the skidder at its forward end and a pair of hydraulic cylinders are mounted between the skidder main frame and the blade assembly for swinging the latter vertically. The skidder includes a bottom guard which is vertically pivotally mounted to the underside of the main frame at the forward end thereof and a cable is connectible between the blade assembly and the bottom guard to act as a motion-transfer means for causing the bottom guard to be raised and lowered concurrently with the raising and lowering of the blade assembly when screw fasteners normally holding the bottom guard in its installed position are removed.

3 Claims, 1 Drawing Figure

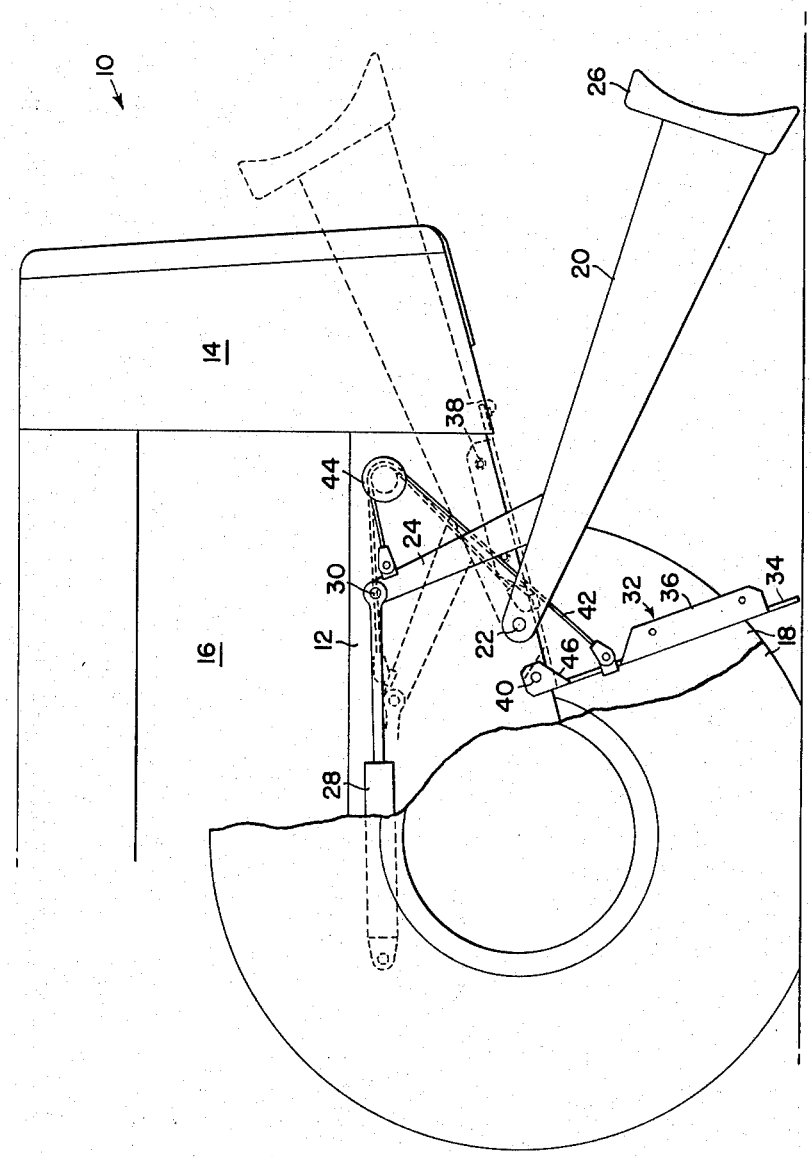

DEVICE FOR POSITIONING A PIVOTAL VEHICLE BOTTOM GUARD

BACKGROUND OF THE INVENTION

The present invention relates to a bottom guard for a vehicle and more particularly relates to a bottom guard which is positionable through means of a power actuated arm mounted on the vehicle and having a purpose other than for just causing movement of the bottom guard.

Off-the-road vehicles such as skidders, bulldozers and the like are provided with bottom guards to prevent damage to the bottom of the engine and drive housings as would result if the vehicles were operated in areas including obstacles such as logs, boulders, and the like.

When periodic servicing such as draining the engine oil or cleaning out trash is performed on current ones of these vehicles, the bottom guards are normally dropped to the ground thus exposing the underside of the engine or drive train to be serviced. After servicing, the problem exists of lifting and reinstalling the bottom guard in its operating position. The bottom guard is usually of such size and weight that one man cannot lift and position the guard and at the same time insert attaching fasteners without the use of a jack or some other device for lifting the bottom guard.

SUMMARY OF THE INVENTION

According to the present invention, there is provided an improved bottom or belly guard for a vehicle and more specifically there is provided such a belly guard for a vehicle of the type having a power swingable arm or the like mounted thereon.

A broad object of the invention is to provide a vehicle bottom guard constructed so as to be movable to a position exposing elements to be serviced which are normally made inaccessible by the bottom guard, such movement of the bottom guard being obtainable through the use of a power actuator located on the vehicle and normally performing another function. More specifically, it is an object of the invention to provide a belly guard which is vertically swingably mounted at the underside of the forward end of a vehicle having a powered, vertically swingable blade assembly at the forward end thereof and to interconnect the belly guard with the blade assembly with motion-transfer means for causing the belly guard to be raised and lowered concurrently with the power raising and lowering of the blade assembly.

These and other objects will become apparent from the following description and the appended drawing.

BRIEF DESCRIPTION OF THE DRAWING

The sole view is a side view of the forward end of a vehicle embodying a belly guard constructed according to the principles of the present invention.

DESCRIPTION OF THE PREFERRED EMBODIMENT

Preliminary to the description, it is to be understood that the vehicle illustrated is only typical of the type of vehicle with which the present invention is particularly adapted for use. Also, it is to be noted that parts hereinbelow will sometimes be referred to as existing in pairs whereas only one of each pair is shown. It is to be understood that the nondisclosed part is identical to and performs the same function as the one which is shown.

Illustrated is the forward end of a skidder-type tractor which is here designated in its entirety by the reference numeral 10. The tractor 10 includes a fore-and-aft extending main frame comprising a pair of longitudinally extending side frame members 12 having a grille housing 14 secured at the forward ends thereof by means not shown. Located just rearwardly of the grille housing 14 and including a portion of the side frame members 12 is an engine compartment 16. The vehicle forward end is supported on a pair of wheels 18.

A pair of fore-and-aft extending push arms 20 are respectively pivotally connected to the sides of the opposite side frame members 12 as at pins 22 which define a horizontal axis about which the arms are vertically pivotable. The push arms each include an upwardly and rearwardly extending projection 24 which terminates above the pivots 22. Rigidly secured to the forward ends of the push arms is a transverse blade 26 which is located forwardly of the vehicle. For the purpose of adjusting the vertical disposition of the blade 26, there is provided a pair of extensible and retractable hydraulic actuators 28 which respectively have their cylinder ends connected to the side frame members 12 and have their rod ends pivotally connected as at connections 30 to the rearward projections 24 of the push arms. The push arms, projections, blade and actuators thus form a blade assembly.

As shown in dashed lines in the drawing, a vehicle bottom or belly guard 32 extends beneath an area of the vehicle front end which is just rearwardly of the grille housing 14. The belly guard 32 includes a generally rectangular plate portion 34 which extends beneath the front end of the vehicle and has flanges 36 formed integrally with the opposite sides thereof, the flanges 36 embracing the side frame members 12. A plurality of cap screws 38 extend through the flanges and the plate and releasably secure the belly guard to the vehicle frame. The rearward portions of the flanges 36 are received on respective pins 40 which define a horizontal axis about which the belly guard is swingable vertically when the cap screws 38 are removed. This permits the belly guard to drop to the solid line position illustrated so as to permit the operator to service any elements which would normally be located above the belly guard when it is in its dashed line position. For the purpose of being able to swing the belly guard vertically about the pins 40 when the cap screws 38 are removed, a pair of motion-transmitting means in the form of cables 42 are provided. The cables have their opposite ends respectively connected to the rearward push arm projections 24 and the flanges 36 of the belly guard. In order to keep the line of pull of the cables directed advantageously, a pair of spool-shaped guides 44 are respectively fixed to side frame members 12 at locations forwardly of the rearward arm projections 24 and the cables are trained about the guides 44. It is here noted that the flanges 36 have clearance notches 46 formed therein so that the belly guard 32 will clear the push arm pins 22 when the belly guard is swung from the lowered position shown in solid lines to the installed position shown in dashed lines. When the belly guard 32 is secured in its installed position shown in dashed lines in the illustration, the cables 42 may be removed and stored in the tool box of the tractor.

It is thought that the operation of the invention is quite clear from the foregoing description and for the sake of brevity no further description of the operation is given.

I claim:

1. In a vehicle of the type having a forward end including a main frame extending in the direction of travel and comprising opposite side plate members defining lower side portions of the forward end, a pair of push arms respectively located at the opposite sides of the forward end and having their rear ends pivotally connected to said opposite side plate members by means defining a horizontal pivot axis and having their forward ends fixed to a transversely extending blade, a pair of extensible and retractable hydraulic actuators being located on opposite sides of said forward end and having their opposite ends respectively connected to said main frame and said push arms for selectively swinging the latter about said horizontal axis, the push arms, blade and actuators thus forming a blade assembly, the improvement comprising: a belly guard member forming the underside of at least a portion of said vehicle forward end; means pivotally connecting the rear portion of said belly guard member to said main frame for movement about a second axis extending parallel to said horizontal pivot axis; releasable fastener means normally connecting said belly guard to said main frame in a raised, installed position covering a preselected area of the underside of the vehicle; and motion-transfer means being connected between the blade assembly and said belly guard for causing the latter to be raised and lowered together with said push arms when the releasable fastener means are released.

2. The vehicle defined in claim 1 wherein said motion-transfer means includes a pair of cables located at the opposite sides of the vehicle and respectively having their opposite ends connected to said blade assembly and said belly guard.

3. The vehicle defined in claim 2 wherein said motion-transfer means also includes a pair of cable guide means respectively fixed to the opposite side plate members and said pair of cables being respectively trained over said pair of guide means.

* * * * *